United States Patent [19]

Gourd

[11] Patent Number: 4,854,797
[45] Date of Patent: Aug. 8, 1989

[54] THREADED FASTENER WITH RESILIENT LINKING MEANS

[75] Inventor: James T. Gourd, Dearborn, Mich.

[73] Assignee: Ford Motor Company, Dearborn, Mich.

[21] Appl. No.: 256,351

[22] Filed: Oct. 5, 1988

[51] Int. Cl.⁴ .................... F16B 35/02; F16B 35/00
[52] U.S. Cl. ............................ 411/383; 411/392; 411/907; 411/908; 411/916
[58] Field of Search .................. 411/10–12, 411/383, 384, 392, 907, 908, 916

[56] References Cited

U.S. PATENT DOCUMENTS

| | | | |
|---|---|---|---|
| 3,102,447 | 9/1963 | Gregory et al. | 411/908 |
| 3,296,048 | 1/1967 | Wolfe | 411/908 |
| 3,367,694 | 2/1968 | Witt | 411/908 |
| 3,495,494 | 2/1970 | Scott | 411/908 |
| 4,348,141 | 9/1982 | Dahl . | |
| 4,416,572 | 11/1983 | Black . | |
| 4,437,286 | 3/1984 | Maguire . | |
| 4,589,179 | 5/1986 | Hulting, Jr. . | |

FOREIGN PATENT DOCUMENTS

| | | | |
|---|---|---|---|
| 736058 | 9/1932 | France | 411/392 |
| 379230 | 8/1964 | Switzerland . | |
| 512315 | 6/1976 | U.S.S.R. . | |
| 838124 | 6/1981 | U.S.S.R. . | |
| 838125 | 6/1981 | U.S.S.R. . | |
| 3197 | 12/1864 | United Kingdom . | |
| 309034 | 8/1930 | United Kingdom . | |
| 2140890A | 12/1984 | United Kingdom . | |

Primary Examiner—Neill R. Wilson
Attorney, Agent, or Firm—Peter D. McDermott; Roger L. May

[57] ABSTRACT

A threaded fastener comprises a head component for the application of torque to the fastener, an externally threaded shank portion, a resilient linking member for interconnecting the head component and the shank portion a certain axial distance apart and for resiliently biasing against axial displacement of the shank portion from the head component a distance other than such certain axial distance, and a torque transmitting mechanism for transmitting torque from the head component to the shank portion. The torque transmitting mechanism is able to transmit sufficient torque from the head component to the shank portion to cause axial displacement of the shank portion in an aperture in a work piece against the resilient biasing of the resilient linking member, whereby the resilient member is elongated and put in axial tension.

23 Claims, 2 Drawing Sheets

THREADED FASTENER WITH RESILIENT LINKING MEANS

BACKGROUND OF THE INVENTION

The present invention is directed to a threaded fastener with resilient linking means and, more particularly, to a threaded fastener adapted to maintain a plurality of fastened work pieces together under compression.

RELATED ART

It generally is desirable when fastening together work pieces, for example when fastening together multiple sheets or panels or fastening a panel to a frame member, to insure that the work pieces remain tightly fastened together under some degree of compressive force. Thus, for example, in the context of motor vehicle assembly, coplanar panels may be fastened together at an area of overlap or a body panel may be fastened to a structural frame rail. In either case, it is desirable to maintain a tight assemblage during extended usage. Certain factors, however, are known to work against maintaining a tight connection between work pieces held together in assembly by a threaded fastener. A connection may loosen, for example, if the threaded fastener holding the work pieces together slips, that is, rotates out of the fastener aperture in the work pieces. In addition, particularly where at least one work piece and/or the fastener is made of plastic, such as fiber reinforced plastic body panels for a motor vehicle, there may be erosion of the material at the interface between the fastener and the work piece or at the interface between one work piece and another. In addition, thermal expansion and contraction of the fastener and/or the work pieces under the influence of changing ambient temperature can cause an otherwise tight connection to loosen.

It is an object of the present invention to provide a threaded fastener which can maintain a tight connection between work pieces -- a fastener which can accommodate a certain amount of fastener slippage or dimensional change, particularly axial foreshortening of an assembly, while maintaining a tight connection between the pieces. This and other objects and advantages of the invention will be made apparent by the following disclosure of the invention and discussion of preferred embodiments.

SUMMARY OF THE INVENTION

According to the present invention, a threaded fastener comprises:
 a head component for the application of torque to the fastener;
 an externally threaded shank portion co-axial with the head component;
 resilient linking means for resiliently interconnecting the head component and the shank portion a certain axial distance apart when the threaded fastener is in a free state, and for resiliently biasing against axial displacement of the shank portion from the head component a distance other than the aforesaid certain axial distance; and
 torque transmitting means for transmitting torque from the head component to the shank portion, the torque transmitting means being co-axial with the head component with the shank portion and able to transmit sufficient torque from the head component to the shank portion to cause axial displacement of the shank portion in an aperture in a work piece against the resilient biasing of the resilient linking means to elongate the linking means in axial tension.

Threaded fasteners according to the invention as disclosed above provide several significant advantages which those skilled in the art will recognize to comprise a significant advance in the art. A novel and critical feature of the new fastener of the invention is the provision of a resilient linking means which resiliently biases the fastener to a certain axial dimension, most significantly biasing it against axial elongation. During installation of the fastener, a second critical and novel feature of the invention, the aforesaid torque transmitting means, acts to transmit torque from the head component of the fastener to the threaded shank portion. In this way the threaded shank portion is rotationally driven into a work piece. After travel of the head component of the fastener stops when it seats in or against an exterior surface of a work piece, continued transmittal of torque to the threaded shank portion causes it to be screwed further into the fastener aperture overcoming the bias of the resilient linking means. The linking means is thereby axially elongated and, being then in tension, puts the fastened work pieces in compression by pulling the threaded shank toward the head component of the fastener. As discussed further below, it will be apparent to those skilled in the art that the engagement of the torque transmitting means with the threaded shank portion at one end and with the head component at the other end preferably are such as to allow certain axial travel even while not permitting free relative rotational displacement, so that the threaded shank portion is free to travel into the work piece, elongating the resilient linking means. Thereafter, the elongated linking means can accommodate a change in axial dimension of the assembly, such as thermal contraction of the attached work pieces or by erosion of material at the fastener/work piece interface. The elongated linking means accommodates such change in axial dimension by contracting back toward its original axial dimension, i.e., its free state axial dimension. In this way the fastener of the invention maintains a tight connection in the assembly notwithstanding such change in the axial dimension of the assembly.

A second advantage of the invention flows as a consequence of the advantage described immediately above. Specifically, the head component and the externally threaded shank portion of the threaded fastener can be formed of plastic or other material notwithstanding the thermal expansion/contraction of plastic materials or the lower dimensional stability in general of such materials in comparison to metal fasteners. Thus, a greater variety of materials, including plastic, metal, ceramics, etc., will be found suitable for the fastener of the invention than would be suitable for fasteners according to prior known designs. This is particularly advantageous where a plastic component is to be fastened. A fastener of the type disclosed herein can be formed of plastic for such application, thereby avoiding a metal-to-plastic interface which under the influence of vibration or component shifting can produce squeaking or like noises and which can result in accelerated erosion of the plastic at such interface. Of course, numerous fastener features well known to the skilled of the art can be employed together with the above described critical features of the invention. Thus, for example, a thread lock features such as that known commercially under the trademark Nylok can be provided on the threaded shank portion. These and other features and advantages of the invention will be better understood in the light of the following description of certain preferred embodiments, taken in connection with the appended drawings.

BRIEF DESCRIPTION OF THE DRAWINGS

FIG. 3 is a section view of the fastener of FIG. 1 taken through line 3—3 of FIG. 1.

FIG. 4 is a section view of the fastener of FIG. 1 taken through line 4—4 of FIG. 1.

DESCRIPTION OF PREFERRED EMBODIMENTS

Figure 1:
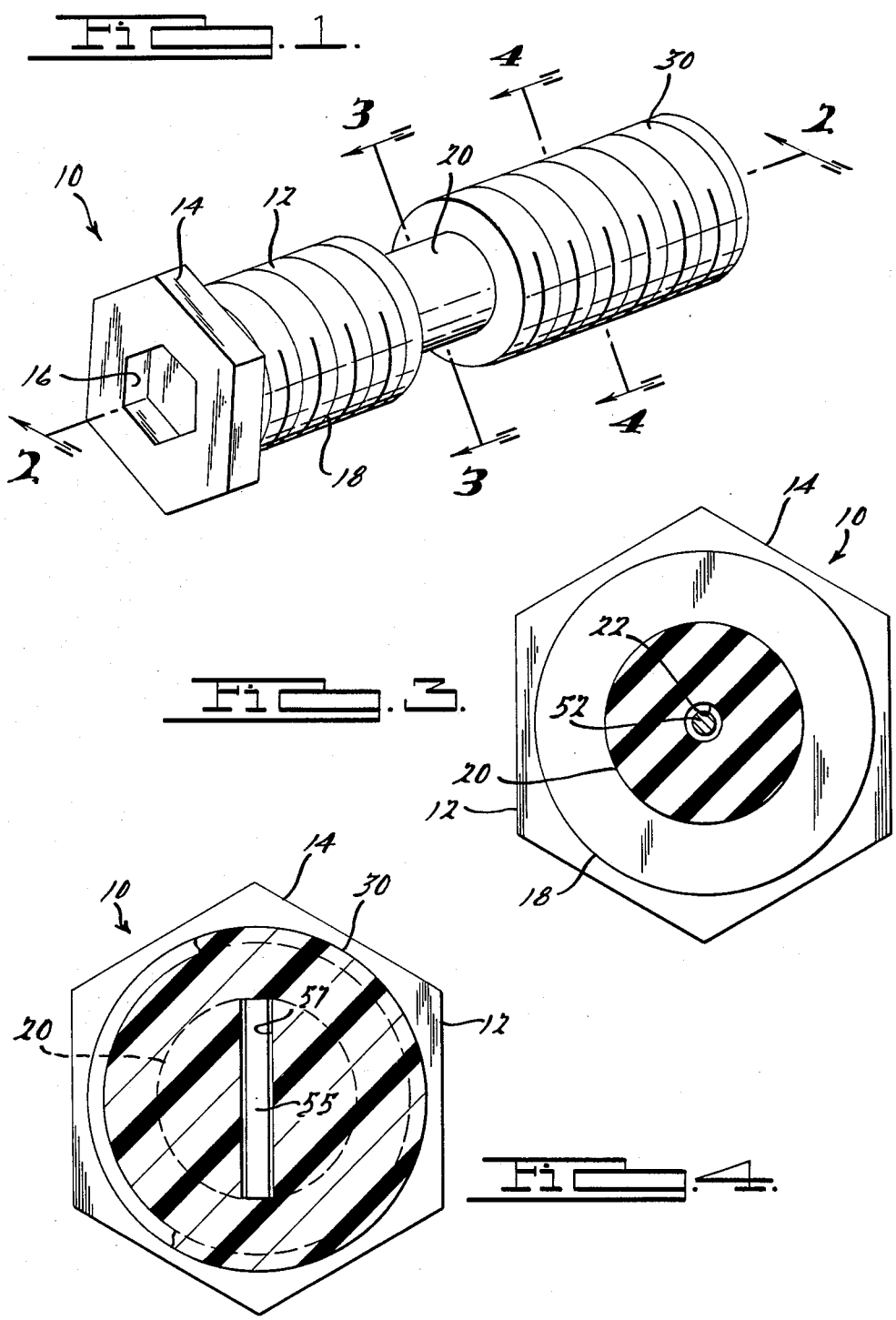
FIG. 1 is a perspective view of a threaded fastener in accordance with the present invention.

In view of the present disclosure those skilled in the fastener arts will readily recognize the usefulness of the present invention in numerous applications in which an assembly is formed, for example, by attachment of a first component to a second component. Thus, for example, the threaded fastener of the invention can be used to fasten together coplanar plates or panels, to fasten a panel to a frame member, such as in the assembly of a motor vehicle body, etc. The threaded fastener of the invention is particularly useful for attaching together two or more coplanar sheets or panels having different coefficients of expansion. The axial resiliency of the fastener facilitates lateral shifting of fastened components over each other without buckling even when one or both are plastic. In such applications it is particularly preferred that the fastener components having an interface with the fastened components comprise plastic material, rather than metal or the like, to reduce or eliminate erosion of the panel at such interface. Also, the resilient linking means according to certain embodiments of the invention provides a substantial measure of lateral flexibility as well as axially elastic resiliency. This can be advantageous in allowing a fastened assembly to absorb lateral impact and/or to allow relative lateral shifting of one component relative another in the assembly due to thermal expansion/compression or the like. It will be apparent to the skilled of the art in view of the present disclosure that the engagement of the resilient linking means with the lower shank portion and with head component can be a freely rotating engagement.

Referring now to FIGS. 1–4, a fastener 10 is seen to comprise a head component 12 adapted by virtue of its hex-head perimeter end portion 14 and/or hex-socket 16 for the application of torque to the fastener. Head component 12 further comprises upper shank portion 18 which can be seen to be of smaller diameter than end portion 14. Shank portion 18 is, according to this preferred embodiment, unitary with the end portion 14 and extends axially therefrom to resilient linking means 20. In the preferred embodiment shown, the upper shank portion 18 is threaded. Optionally, however, this portion of the fastener 10 may be unthreaded so as to slide freely within an aperture in a work piece.

Resilient linking means 20 interconnects the head component 12 to lower shank portion 30 a fixed axial distance apart when the fastener 10 is in its free state. Because the linking means 20 is resilient, it provides bias against axial displacement of the lower shank portion 30 from the head component 12 a distance either more or less than such fixed distance. Linking means 20 can be seen to be coaxial with the head component 12 and with the lower shank portion 30 such that axial force is transmitted substantially uniformly from the head component 12 to the lower shank portion 30. In the embodiment shown, the portion of the elastomeric block spanning the distance between the two shank portions 18, 30 is cylindrical. The resilient linking means 20 is smaller in diameter than the end portion 14 of the head component 12 and is smaller in diameter than the two shank portions 18, 30. Optionally, however, the resilient means 20 may be of diameter equal to that of the shank portions 18, 30.

The resilient linking means 20 preferably comprises a block of elastomeric material. Numerous suitable materials are commercially available and will be apparent to the skilled of the art in view of the present disclosure. Exemplary such materials include natural and synthetic rubbers. Particularly preferred materials include a elastomeric polyurethanes. Alternative suitable resilient linking means include a spring element, such as a coil spring, and the like.

Lower shank portion 30 is seen to be externally threaded. Particularly where upper shank portion 18 is to make threaded engagement with a fastener aperture, lower shank portion 30 will be of the same diameter as or smaller diameter than upper shank portion 18, so as to pass through that portion of the aperture with which upper shank portion 18 will form a threaded engagement.

Figure 2:
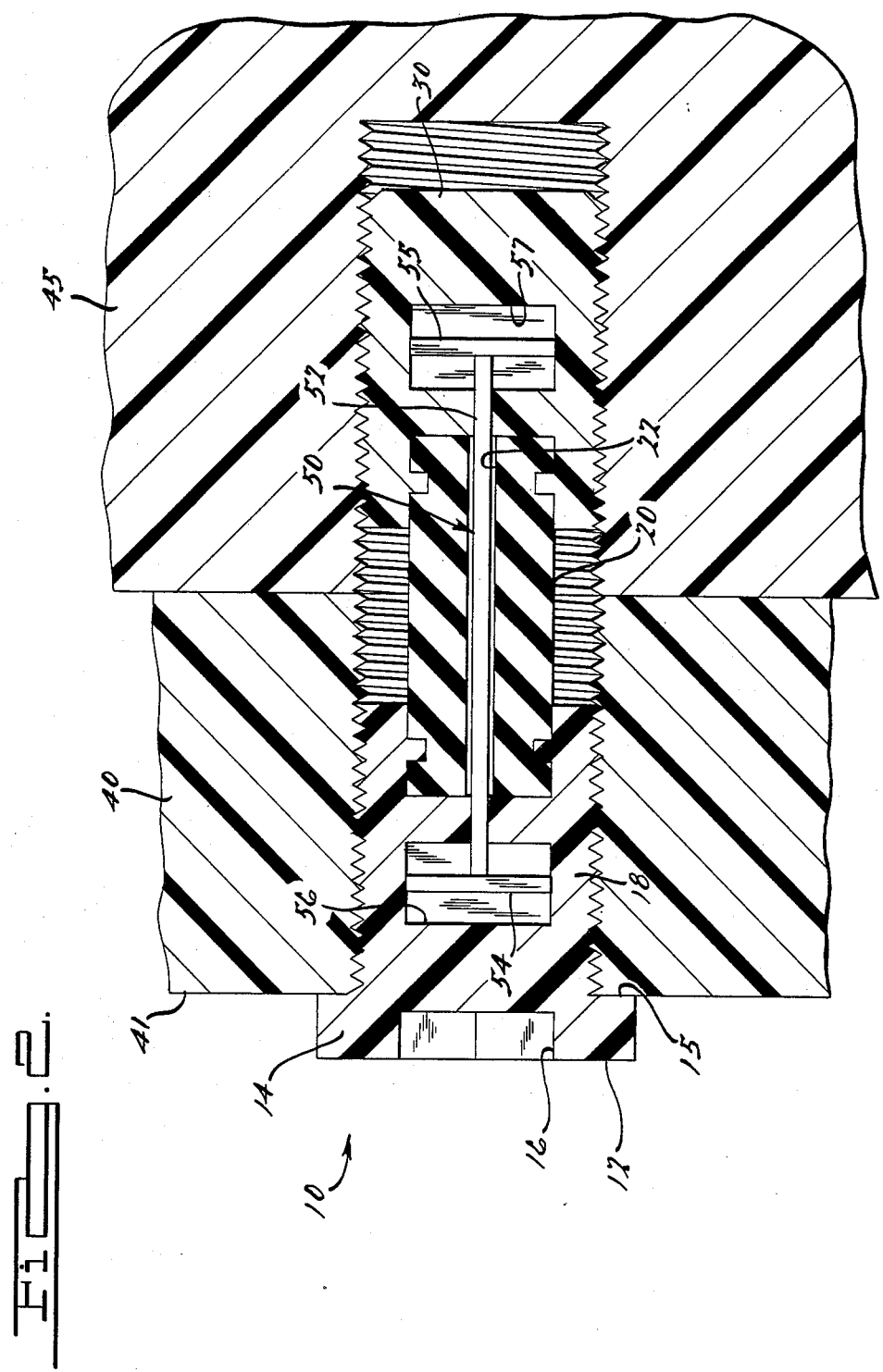
FIG. 2 is a section view of the fastener of FIG. 1 taken through 2—2 of FIG. 1 and shown in an assembly fastening together two work pieces.

Referring specifically now to FIG. 2, fastener 10 is shown in assembly with a first work piece 40 and a second work piece 45. Lower shank portion 30 forms a threaded engagement with an aperture in the second work piece 45 while uppper shank portion 18 forms a threaded engagement work the first piece 40. Shoulder surface 15 of end portion 14 bears against exterior surface 41 of work piece 40. Referring now particularly to FIGS. 2-4, an additional critical element will be described in connection with the mode of operation of the invention. Specifically, the fastener is seen to comprise a torque transmitting means 50. In the preferred embodiment illustrated, torque transmitting means 50 comprises a rigid shaft 52 extending coaxially with the resilient linking means 20. To provide good distribution of torque to the lower shank portion 30, the torque transmitting means 50 should be coaxial with the head component 12 and with the lower shank portion 30. Thus, in the illustrated embodiment the torque transmitting means extends axially through the center of the resilient linking means 20, through axial aperture 22 thereof, from a first non-rotational engagement with the head component 12 to a second non-rotational engagement with the lower shank portion 30. Such non-rotational engagements comprise in cross section, T-shaped ends 54 and 55, respectively. The T-shaped end 54 is housed or received in an axially extending slot 56 in the head component 12, specifically, in the upper shank portion 18 of the head component 12. The lower T-shaped end 55 of the torque transmitting means 50 is housed in axially extending slot 57 in the lower shank portion 30. The axially extending slots 56, 57 in the head component 12 and in the lower shank portion 30 of the fastener 10 can be formed by any of various techniques known to those skilled in the art. These components of the fastener 10 can be molded of plastic or other suitable material in two longitudinal halves that are assembled with the other components (the torque transmitting means 50 and the resilient linking means 20) and are then welded or adhesively bonded together. Alternatively, the resilient means 20 and torque transmitting means 50 can be insert molded into the fastener 10 according to methods and techniques well known to those skilled in the art. Also, so called lost core molding techniques can be employed. Alternative suitable techniques and materials for fabrication of the fastener will be readily apparent to those skilled in the art in view of the present disclosure.

The engagement of the torque transmitting means 50 with the head component 12 and with the lower shank portion 30 of the fastener 10 as described above, allows axial displacement of the torque transmitting means 50 relative those other two components of the fastener 10 while preventing rotation of the torque transmitting means relative to either of them. There preferably is a degree of free axial movement in the engagement of the torque transmitting means 50 with the head component 12 and/or with the lower shank portion 30 so that elongation (and in some embodiments both elongation and compression) of the resilient linking means 20 can occur by axial displacement of the lower shank portion 30 away from (or toward) the head component 12. Relative rotational movement, however, is prevented so that the torque transmitting means 50 can effectively transmit torque from the head component 12 to the lower shank portion 30. In this way the lower shank portion 30 can be rotated into a fastener 10 aperture against the resilient biasing force of the resilient linking means 20. Axial displacement of the lower shank portion 30 into a fastener aperture will elongate the resilient linking means 20 and put it in tension, whereby it can accommodate axial foreshortening of the fastened assembly in the manner described above. Alternative means for accommodating axial elongation and compression of the resilient linking means 20 will be apparent to those skilled of the art in view in the present disclosure. Certain embodiments of the invention, for example, employ a torque transmitting means with ends immovably embedded in the head component and lower shank component and having a telescoping shaft with means, such as, flutes or a non-circular cross section, to prevent free rotation of one shaft portion relative another.

According to preferred embodiments of the invention, the torque transmitting means 50 is rotationally yieldable at a torque, referred to herein as the "yield torque" of the torque transmitting means 50, which is less than the threaded fastener's failure torque. By rotationally yieldable is meant that the torque transmitting means 50 at its yield torque ceases to transmit significant torque to the lower shank portion 30 of the fastener 10. As the resilient means 20 is elongated and put in tension, the torque needed to further drive the lower shank portion 30 into a fastener aperture increases. At a certain torque, the yield torque of the torque transmitting means 50, it will be unable to further drive the lower shank portion 30. Where the yield torque is less than the threaded fastener's failure torque, this can provide significant protection against failure of the fastener 10 due to over tightening. By failure of the fastener what is meant is that the threads are stripped or permanently deformed sufficiently to significantly reduce the strength of the connection formed by the fastener 10 or that the resilient linking means 20 is extended beyond its elastic deformation point, e.g. to the point of rupture, or that the end portion 14 of the head component 12 is sheared from the fastener 10 or any like damage which would significantly interfere with the performance of the fastener 10.

The torque transmitting means 50 may become rotationally yieldable by being fractureable at the yield torque. Thus, for example, it would be within the skill of the art to design a torque transmitting means which would fracture, shatter, snap etc. at or about a preselected torque. With reference to the embodiment shown in the drawings, shaft 52 or the entire torque transmitting means 50 can be fabricated of tool steel or a like brittle material such that it will be fractureable at or about a predictable torque. Other suitable materials for the torque transmitting means include, for example, other metals, glass, ceramic and the like.

It should be recognized and understood that the foregoing description of presently preferred embodiments of the invention are presented for exemplification and not limitation of the invention. Certain modifications and variations of those fastener will be apparent to the skilled in the art in view of the present disclosure and the present or future state of the art, which modifications and variations are intended to be within the scope of the following claims.

I claim:
1. A threaded fastener comprising:
  a head component for the application of torque to the fastener;
  an externally threaded shank portion coaxial with said head component;
  resilient linking means for resiliently interconnecting said head component and said shank portion a certain axial distance apart when said threaded fastener is in a free state, and for resiliently biasing against axial displacement of said shank portion from said head component a distance other than said certain axial distance; and
  torque transmitting means for transmitting torque from said head component to said shank portion, said torque transmitting means being coaxial with said head component and said shank portion and being able to transmit sufficient torque from said head component to said shank portion to cause axial displacement of said shank portion in an aperture in a work piece against the resilient biasing of said resilient linking means to elongate said resilient linking means in axial tension, and said torque transmitting means comprising at least one member distinct from said resilient linking means.

2. The threaded fastener of claim 1 wherein said torque transmitting means has a smaller diameter than said head component.

3. The threaded fastener of claim 1 wherein said torque transmitting means is rotationally yieldable at a yield torque less than said threaded fastener's failure torque.

4. The threaded fastener of claim 1 wherein said torque transmitting means comprises a rigid shaft extending coaxially with and within said resilient linking means from first non-rotational engagement with said head component to second non-rotational engagement with said shank portion.

5. The threaded fastener of claim 4 wherein said first non-rotational engagement and said second non-rotational engagement each comprises a T-shaped end of said rigid shaft, said T-shaped end of said first non-rotational engagement being housed in an axially extending slot in said head component and said T-shaped end of said second non-rotational engagement being housed in an axially extending slot in said shank portion.

6. The threaded fastener of claim 4 wherein said rigid shaft is formed of a material selected from the group consisting of metal, glass, ceramic and the like.

7. The threaded fastener of claim 4 wherein said rigid shaft is formed of tool steel.

8. The threaded fastener of claim 3 wherein said torque transmitting means is fracturable at said yield torque.

9. The threaded fastener of claim 1 wherein said resilient linking means is coaxial with said head component and said shank portion and is of smaller diameter than said head component.

10. The threaded fastener of claim 1 wherein said resilient linking means comprises a block of elastomeric material.

11. The threaded fastener of claim 10 wherein at least that portion of said block of elastomeric material spanning said certain axial distance between said head component and said shank portion is cylindrical.

12. The threaded fastener of claim 10 wherein said block of elastomeric material makes a first freely rotating engagement with said head component and a second freely rotating engagement with said shank portion.

13. The threaded fastener of claim 10 wherein said elastomeric material is selected from the group consisting of natural and synthetic rubbers and the like.

14. The threaded fastener of claim 10 wherein said elastomeric material is selected from the group consisting of elastomeric polyurethanes.

15. The threaded fastener of claim 1 wherein said head component comprises a torque receiving end portion and an upper shank portion of smaller diameter than said end portion, said upper shank portion being unitary with said end portion and extending coaxially therewith to engagement with said resilient linking means.

16. The threaded fastener of claim 15 wherein said upper shank portion is threaded.

17. The threaded fastener of claim 15 wherein said upper shank portion has a diameter equal to that of said shank portion.

18. The threaded fastener of claim 1 wherein said head component and said shank portion are formed of the same material.

19. The threaded fastener of claim 18 wherein said material is selected from the group consisting of metal, plastic, ceramic and the like.

20. A threaded fastener for fastening work pieces together under compression, said fastener comprising:
a head component for the application of torque to the fastener, said head component comprising a torque receiving end portion and coaxial and unitary therewith an upper shank portion having a diameter less than that of said end portion;
an externally threaded lower shank portion formed of plastic and having a smaller diameter than said end portion and the same diameter of the upper shank portion, said lower shank portion being coaxial with said upper shank portion;
resilient linking means for resiliently interconnecting said upper shank portion and said lower shank portion a certain axial distance apart when said threaded fastener is in a free state, and for resiliently biasing against axial displacement of said lower shank from said upper shank portion a distance other than said certain axial distance, said resilient linking means comprising a block of elastomeric material of which at least that portion spanning said certain axial distance between said upper shank portion and said lower shank portion is cylindrical, coaxial with said upper shank portion and said lower shank portion, and of diameter no larger than that of said upper shank portion and said lower shank portion; and
torque transmitting means for transmitting torque from said head component to said lower shank portion, said torque transmitting means comprising a rigid shaft extending through said cylindrical portion of said resilient linking means coaxially therewith from a first T-shaped end of said rigid shaft housed in an axially extending slot in said upper shank portion to form a first non-rotational engagement therewith to a second T-shaped end housed in an axially extending slot in said lower shank portion to form a second non-rotational engagement therewith, said torque transmitting means being able to transmit sufficient torque from said head component to said lower shank portion to axially displace said lower shank portion in a work piece against the resilient biasing of said resilient linking means to elongate said resilient linking means and put it in axial tension, and being fractureable at a yield torque which is less than said threaded fastener's failure torque.

21. A threaded fastener comprising:
a head component for the application of torque to the fastener;
an externally threaded shank portion coaxial with said head component;
a resilient linking member resiliently interconnecting said head component and said shank portion a certain axial distance apart when said threaded fastener is in a free state, and resiliently biasing against axial displacement of said shank portion from said head component a distance other than said certain axial distance; and
a torque transmitting member transmitting torque from said head component to said shank portion, said torque transmitting member being coaxial with said head component and said shank portion and being able to transmit sufficient torque from said head component to said shank portion to cause axial displacement of said shank portion in an aperture in a work piece against the resilient biasing of said resilient linking member to elongate said resilient linking member in axial tension.

22. A threaded fastener comprising:
a head component for the application of torque to the fastener;
an externally threaded shank portion coaxial with said head component;
resilient linking means for resiliently interconnecting said head component and said shank portion a certain axial distance apart when said threaded fastener is in a free state, and for resiliently biasing against axial displacement of said shank portion from said head component a distance other than said certain axial distance; and
torque transmitting means for transmitting torque from said head component to said shank portion, said torque transmitting means being coaxial with said head component and said shank portion and being able to transmit sufficient torque from said head component to said shank portion to cause axial displacement of said shank portion in an aperture in a work piece against the resilient biasing of said resilient linking means to elongate said resilient linking means in axial tension, and said torque transmitting means comprising a rigid shaft extending from said head component to said shank portion and being adjacent to said resilient linking means.

23. A threaded fastener comprising:

a head component for the application of torque to the fastener;

an externally threaded shank portion coaxial with said head component;

resilient linking means for resiliently interconnecting said head component and said shank portion a certain axial distance apart when said threaded fastener is in a free state, and for resiliently biasing against axial displacement of said shank portion from said head component a distance other than said certain axial distance; and torque transmitting means for transmitting torque from said head component to said shank portion, said torque transmitting means being coaxial with said head component and said shank portion and being able to transmit sufficient torque from said head component to said shank portion, in addition to any torque transmitted by said resilient linking means, to cause axial displacement of said shank portion in an aperture in a work piece against the resilient biasing of said resilient linking means to elongate said resilient linking means in axial tension.

* * * * *